(12) United States Patent
Joshi et al.

(10) Patent No.: US 12,033,101 B2
(45) Date of Patent: Jul. 9, 2024

(54) WEB-BASED SYSTEM AND METHOD FOR UNIT VALUE DRIVER OPERATIONS

(71) Applicant: SAP SE, Walldorf (DE)

(72) Inventors: Mudit Joshi, Delhi (IN); Kiran Prashanth Kulkarni, Bangalore (IN); Rahul Seshagiri Srivatsa, Mysore (IN); Avinash Permude, Bangalore (IN); Erik Scheithauer, Vienna (AT); Nithya Rajagopalan, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/160,820

(22) Filed: Jan. 28, 2021

(65) Prior Publication Data

US 2022/0237542 A1     Jul. 28, 2022

(51) Int. Cl.
    *G06Q 10/0631*     (2023.01)
    *H04L 67/02*        (2022.01)

(52) U.S. Cl.
    CPC ........ *G06Q 10/06315* (2013.01); *H04L 67/02* (2013.01)

(58) Field of Classification Search
    CPC ....... G06Q 10/06315; G06Q 10/06395; G06Q 10/00; G06Q 10/02; G06Q 10/06;
    (Continued)

(56) References Cited

U.S. PATENT DOCUMENTS

| 9,619,769 B2 | 4/2017 | Ploesser et al. |
| 2003/0155415 A1* | 8/2003 | Markham ............... G06Q 50/00 235/376 |

(Continued)

FOREIGN PATENT DOCUMENTS

CA     2105784 A1     12/1994

OTHER PUBLICATIONS

Ng, Irene CL, David Xin Ding, and Nick Yip. "Outcome-based contracts as new business model: The role of partnership and value-driven relational assets." Industrial Marketing Management 42.5 (2013): 730-743. (Year: 2013).*

(Continued)

*Primary Examiner* — Robert D Rines
(74) *Attorney, Agent, or Firm* — SCHWEGMAN LUNDBERG & WOESSNER, P.A.

(57) ABSTRACT

Various examples are directed to determining an impact of a subunit on the value of a unit. A web-based analytics system receives unit value data via a user interface page provided to a supplier computing device by a web application, the unit value data including relationship data describing a relationship between a plurality of subunit values and a unit value. Based on relationship data, the system increases a value for a first subunit while holding values for the other subunits constant until the value of the unit increases to a unit value threshold and increases a value for a second subunit while holding values for the other subunits constant until the value of the unit increases to a unit value threshold. The system compares an increase in the value of the first subunit to increase the value of the unit to the unit value threshold with an increase in the value of the second subunit to increase the value of the unit to the unit value threshold. Based on the comparing, the system determines that the first subunit is a more significant driver of the value of the unit than the second subunit.

20 Claims, 9 Drawing Sheets

(58) Field of Classification Search
CPC ........ G06Q 10/10; G06Q 30/02; H04L 67/02; G05B 2219/31357
See application file for complete search history.

(56) References Cited

U.S. PATENT DOCUMENTS

| | | | |
|---|---|---|---|
| 2003/0158795 A1* | 8/2003 | Markham | G05B 19/4183 705/28 |
| 2004/0006503 A1 | 1/2004 | Jarvis | |
| 2005/0120010 A1 | 6/2005 | Philpott et al. | |
| 2006/0059036 A1 | 3/2006 | Moese et al. | |
| 2006/0178918 A1* | 8/2006 | Mikurak | G06Q 10/06315 705/7.31 |
| 2006/0218010 A1* | 9/2006 | Michon | G16H 50/30 702/19 |
| 2006/0265257 A1* | 11/2006 | Pulfer | G06Q 10/06375 705/7.41 |
| 2007/0192170 A1* | 8/2007 | Cristol | G06Q 10/0639 705/7.23 |
| 2007/0294128 A1* | 12/2007 | Wedemeyer | G06Q 30/0203 705/7.33 |
| 2009/0248494 A1* | 10/2009 | Hueter | G06Q 30/0202 705/7.29 |
| 2013/0080266 A1* | 3/2013 | Molyneux | G06Q 10/00 715/234 |
| 2013/0290234 A1* | 10/2013 | Harris | G06Q 30/00 901/50 |
| 2013/0346143 A1 | 12/2013 | Sebastian et al. | |
| 2015/0227991 A1 | 8/2015 | Yu | |
| 2018/0174174 A1 | 6/2018 | Vasyutynskyy | |

OTHER PUBLICATIONS

Qian et al., Design of Web-based Cost Estimator and Supplier Selection with Unified Modeling Language, Sep. 26, 2008, IEEE, pp. 1-7 (Year: 2008).*

* cited by examiner

WEB-BASED SYSTEM AND METHOD FOR UNIT VALUE DRIVER OPERATIONS

TECHNICAL FIELD

This document generally relates to methods and systems for use with computer networks. More particularly, this document relates to ways of configuring and operating computing devices to use a web-based system to identify and optimize unit value drivers.

BACKGROUND

Computing systems are used to perform processing related to unit costing and accounting. Such systems may use databases to store data, often in a structured and easily-accessible way. Data received and stored by a computing system can be used for basic accounting and costing-related tasks.

BRIEF DESCRIPTION OF DRAWINGS

The present disclosure is illustrated by way of example and not limitation in the following figures.

DETAILED DESCRIPTION

Figure 1:
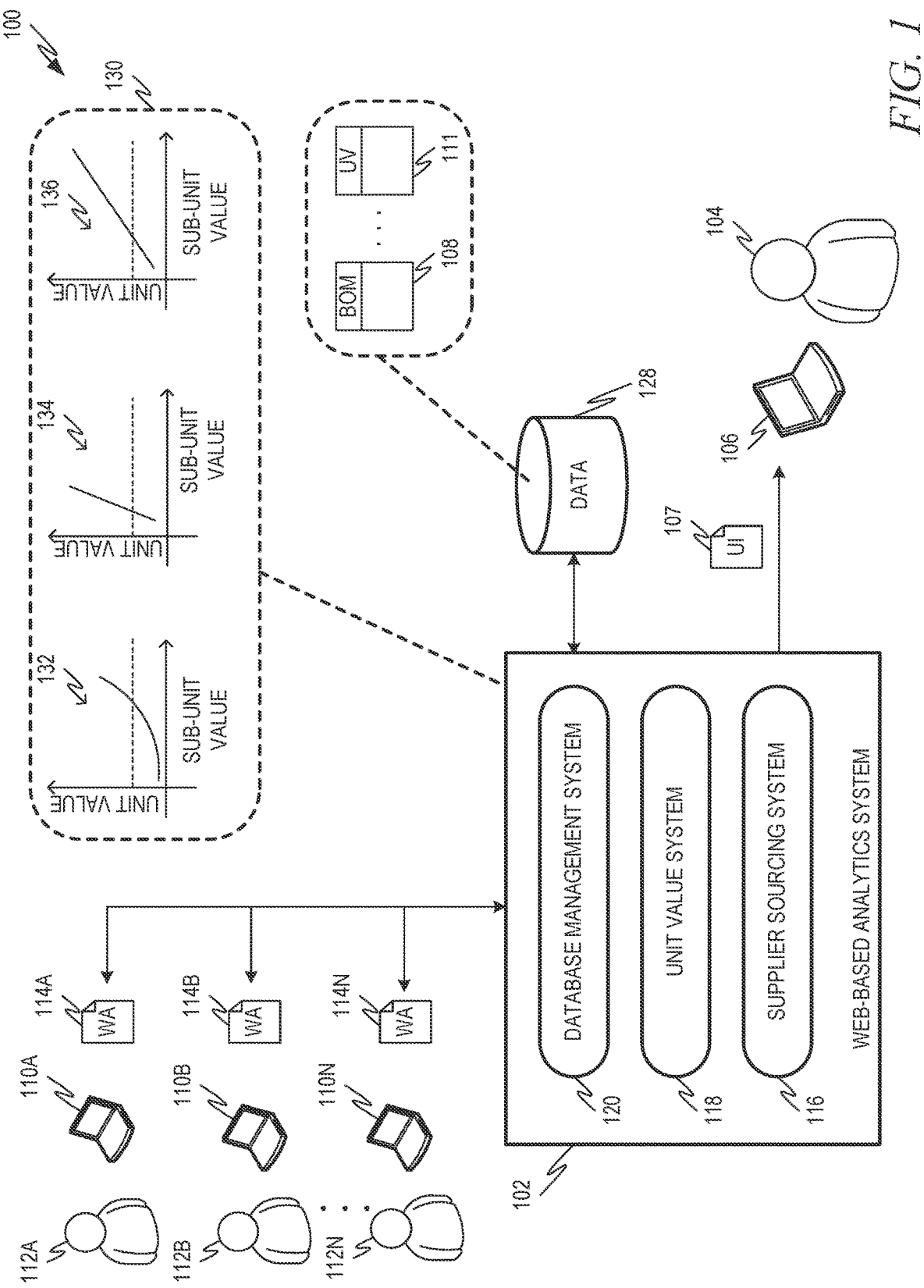
FIG. 1 is a diagram showing one example of an environment for executing a web-based system for performing unit value driver operations.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

It is desirable for a business enterprise generating a product to understand the units or subunits of the product that are cost or value drivers. A value driver of a unit is a constituent subunit of the unit, where changes in the value of the subunit strongly correlate to changes in the value of the unit as a whole. Consider an example tablet computer. Units of the tablet computer may include a screen, a battery, a processor, a camera module, assembly costs, and so forth. Some or all of the units may be sourced from third party suppliers, with the value of the units represented by a cost paid to the supplier to provide the various units. In practice, the value of the various units can be driven by respective subunits of their own. For example, a battery for the example tablet computer may be comprised of raw material (e.g. a lithium compound, carbon, packaging material, etc.) as well as labor costs for assembling the raw material. Accordingly, the value of the overall product may depend on the value of lithium or carbon in a way that may not be immediately apparent to the producer of the product.

Equation [1] provides a value of an example unit that is a summation of the subunits making up the unit:

$$UV = \Sigma \text{Raw Materials} + \Sigma \text{Conversion Costs} + \Sigma \text{Procured Parts} \quad [1]$$

In this example, the unit value (UP) is the sum of raw material subunits plus the sum of conversion cost subunits plus the sum of procured parts subunits. With the relationship given by Equation [1], the value impact of any given subunit on the overall value of the unit can be determined with a relatively simple calculation. For example, an increase in the cost of raw materials by X may result in a corresponding increase of X in the unit value. Consider another example given by Equation [2] below:

$$UV = \left(\left(\left(\sum \text{Raw Materials} + \sum \text{Procured Parts}\right) + 10\% \text{ Duty} + 5\% \text{ Overhead}\right) + \left(\sum \text{Conversion Costs} + 12\% \text{ Engineering \& Design} + 2\% \text{ Machine ADjustments}\right)\right) + 7\% \text{ Markup} \quad [2]$$

In the example of Equation [2], the value impact of, for example, raw material subunits is not straightforward and depends on the amount of a duty and overhead that is not applicable to other subunits. These and similar relationships may be not be immediately apparent to a user, meaning that the value drivers for a unit or subunit may be hidden.

It may be desirable for a sourcing manager to be aware of the impact that various subunits have on the value of a unit, including hidden impacts. Returning again to the example tablet computer screen above, if the value of the screen unit depends on the market value of lithium as well as another factor, such as a duty or transportation cost, it may be desirable for the sourcing manager to select another supplier for the battery in a different location (e.g., not subject to the duty or with a lower transportation cost). Also, for example, if the sourcing director finds that a unit value depends on a factor such as overhead or markup, the sourcing manager may be empowered to approach the supplier and request a different price for the unit.

Data intake can present a significant obstacle, which prevents computing systems from determining and acting on subunit value impact determinations, as described herein. For example, finding hidden unit value impacts, as described herein, may require detailed data describing subunit values as well as relationships between subunit values and the overall value of a unit. Obtaining this information from a variety of different suppliers or potential suppliers in a format that is readily usable by a computing device can represent a significant challenge. For example, suppliers may provide information about their unit and subunit values in a proprietary format, such as a spreadsheet stored in Google Sheets, Microsoft Excel, or a similar product. These spreadsheets, for example, may be generated manually by a user at the supplier and/or in an automated manner by the accounting database management systems of the various suppliers. Spreadsheets including unit and subunit value information can be e-mailed to the potential customer. Each spreadsheet can include different information arranged in a proprietary manner as determined, for example, by the personnel and/or accounting database management system of the individual supplier.

To utilize spreadsheet data received from suppliers in a computing system, it may be necessary for a sourcing manager or other user to manually enter voluminous data received from many different suppliers, where each supplier's data can be in a unique format. This presents an obstacle to determining subunit value impacts, including hidden subunit value impacts.

Various examples address these and other challenges by providing a web-application based supplier interface with the subunit impact analysis operations as described herein. A web-based value system provides web application code to one or more supplier computing systems. The supplier computing systems execute the web application code to implement the web application, for example, in a supplier system web browser. When executed, the web application prompts the supplier user to provide unit value data for a unit provided by the supplier. The unit value data can include a description of a plurality of sub-units making up the unit as well as relationship data describing a relationship between a plurality of subunit values, such as the example relationships given by Equations [1] and [2] above.

Received data can be used to analyze unit and subunit value data. An example computing system may determine the cost impact of a subunit by first determining a value of the unit with the cost of the constituent subunits fixed. The value of a first subunit is increased and a new unit value is determined. If the new unit value is not greater than or equal to a unit value threshold, the computing system increases the first subunit value again and determines a next unit value. This process continues until the determined unit value is greater than or equal to a unit value threshold. The computing system records the amount of the increase in the subunit value that brought the unit value to the unit value threshold. This process may be performed for some or all of the sub-units of the unit. Subunits requiring a smaller value increase to bring the total unit value to the unit value threshold may have a comparatively larger value impact on the unit than subunits requiring a larger increase. Accordingly, a sourcing manager may select a different supplier having fewer related costs for the high-impact subunits, for example, based on location or cost structure. In another example, the sourcing manager may attempt to substitute different, less expensive sub-units for the high-impact sub-units.

FIG. 1 is a diagram showing one example of an environment 100 for executing a web-based system for performing unit value driver operations, as described herein. The environment 100 includes a web-based analytics system 102. The web-based analytics system 102 can be implemented using any suitable computing device or set of computing devices. In some examples, the web-based analytics system 102 includes one or more servers located at a single geographic location or distributed across multiple geographic locations. The web-based analytics system 102 includes various subsystems including a database management system 120, a unit value system 118, and a supplier sourcing system 116. The subsystems 120, 118, 116 may be applications or other software executed at the web-based analytics system and/or may include separate computing hardware (e.g., separate servers) executing software that is in communication with the web based analytics system 102.

The database management system 120 manages a data store 128 and may be used to receive and store various data used herein, such as unit value data, BOM or other data describing products, units, or subunits, or other relevant data. In some examples, the database management system 120 is used to perform processing associated with unit value operations, as described herein. In some examples, the database management system 120 is or includes an in-memory database management system such as a HANA or S/4 HANA system available from SAP SE of Walldorf, Germany.

The unit value system 118 may execute and/or manage unit value operations, as described herein. For example, the unit value system 118 may execute operations for determining value drivers of various units. The unit value system 118, in some examples, generates queries or other instructions that are provided to the database management system 120 for executing unit value operations.

The supplier sourcing system 116 is configured to assist a user 104 in selecting a supplier to provide a unit for a product, also using the database management system 120. In some examples, the supplier sourcing system 16 is configured to select one or more suppliers that are solicited to provide bids or interaction proposals for supplying a unit. The supplier sourcing system 116 may also recommend an interaction proposal for selection by the user 104 to provide the unit. In some examples, the supplier sourcing system 116 is also configured to receive unit value driver data from the unit value system 118. The supplier sourcing system 116 may utilize the unit value driver data to select a recommended action for the user 104. The recommended action may include, for example, selecting a substitute sub-unit and selecting a supplier with different characteristics (e.g., a different geographic location, different labor costs, etc.) as described herein.

The web-based analytics system 102 receives unit value data from one or more supplier computing devices 110A, 110B, 110N. Supplier computing devices 110A, 110B, 110N may be or include any suitable computing devices including, for example, desktop computers, laptop computers, tablet computers, etc. Supplier computing devices 110A, 110B, 110N may be associated with one or more suppliers (e.g., suppliers who could potentially provide a unit or sub-unit for inclusion in a product). In some examples, supplier computing devices 110A, 110B, 110N are monitored and/or controlled by one or more supplier users 112A, 112B, 112N.

The web-based analytics system 102 provides web application code 114A, 114B, 114N to the supplier computing devices 110A, 110B, 110N. The web application code 114A, 114B, 114N is executable at the supplier computing devices 110A, 110B, 110N to provide a user interface. In some examples, the web application code 114A, 114B, 114N executes in a web browser or other suitable browser executing at the respective supplier computing devices. For example, a supplier user 112A, 112B, 112N may enter into the browser a Universal Resource Locator (URL) or other suitable address associated with the web-based analytics system 102. The web-based analytics system 102 may provide the web application code 114A, 114B, 114N in response. Upon receiving the web application code 114A, 114B, 114N, the supplier computing device 110A, 110B, 110N executes the web application, for example, in the browser.

The web application, upon execution, provides a user interface page associated with a particular unit provided by the supplier. The supplier user 112A, 112B, 112N causes unit value data for the unit to be entered into the user interface page. This may occur in any suitable manner. In some examples, the supplier user 112A, 112B, 112N manually enters unit value data into the user interface page. This may not require significant additional time or effort for the supplier user 112A, 112B, 112N as compared to entering the same data into a spreadsheet. In other examples, the user interface page comprises an input feature (e.g., button, link, etc.) that, when selected by the supplier user 112A, 112B, 112N prompts the user 112A, 112B, 112N to provide a link to an accounting database management system of the respective supplier. The web application may be configured to communicate with the supplier's accounting database management system to receive unit value data from the respective suppliers.

Figure 2:
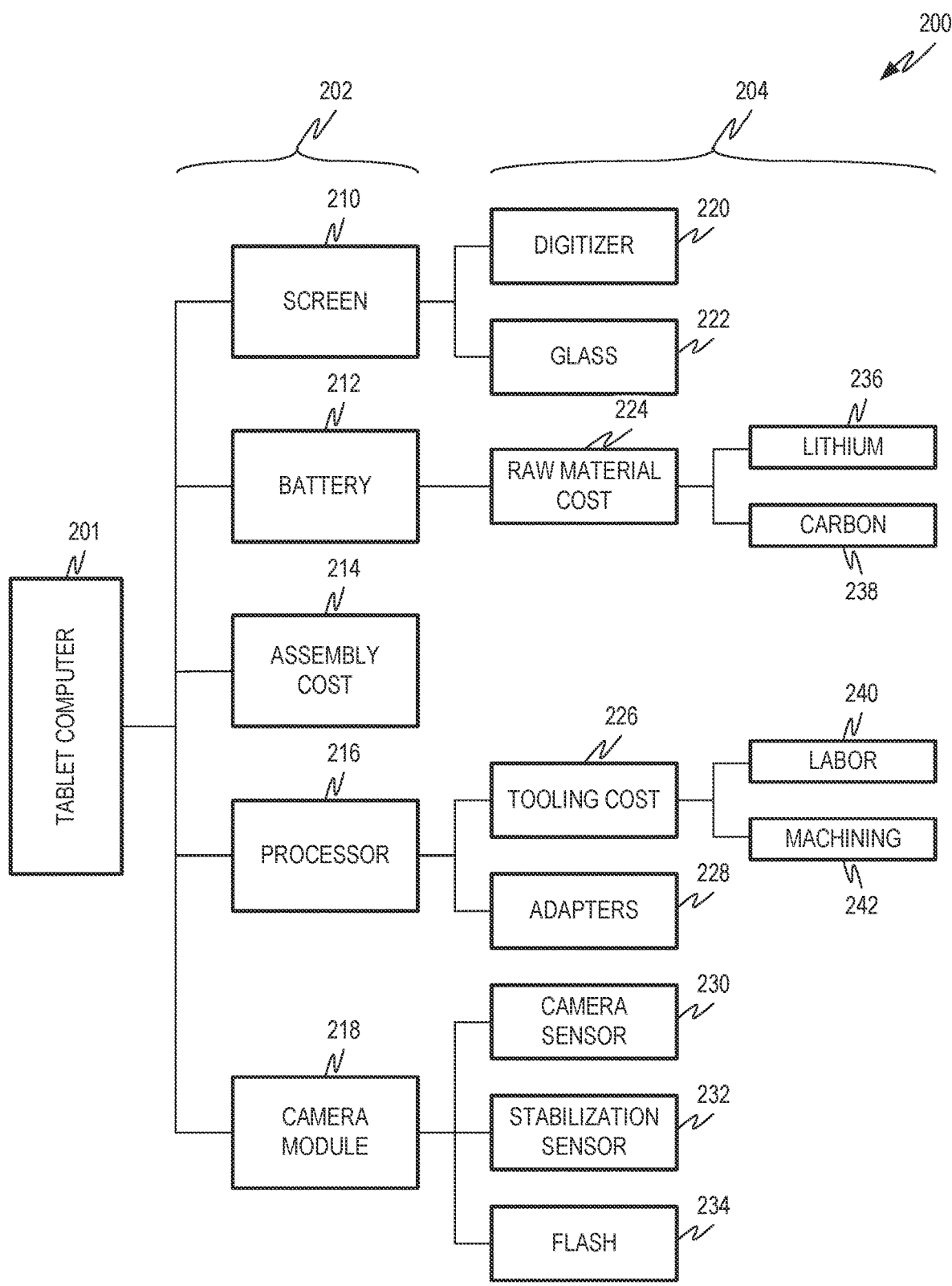
FIG. 2 is a diagram showing a bill of materials (BOM) for an example product.

Unit value data received from the suppliers may be stored at the data store 128 by the database management system 120. In some examples, the database management system 120 is used to store the unit value data at a BOM table 108. The BOM table 108 may include records indicating units and subunits of a product and associated values thereof. FIG. 2 is a diagram 200 showing a BOM for an example product and illustrating how unit value data can be stored at the BOM table 108.

The example product shown in FIG. 2 is a tablet computer 201. The BOM level 202 includes units that are direct components of the tablet computer 201 including, for example, a screen 210, a battery 212, assembly cost 214, a processor 216, and a camera module 218. The components 210, 212, 214, 216, 218 may be units procured from suppliers. In some examples, the unit value system 118 may be used to determine subunits thereof that are value drivers, as described herein.

FIG. 2 also shows example subunits 204 for the various components 210, 212, 214, 216, 218. The screen 210, for example, includes subunits such as a digitizer 220 and glass 222. The battery 212 includes a raw material cost 224. The processor 216 includes a tooling cost 226 and adapters 228. The camera module 218 includes a camera sensor 230, a stabilization sensor 232, and a flash 234.

In some examples, the unit value system 118 may determine unit value drivers for one or more subunits 204 as well. For example, the raw material cost 224 of the battery 212 may have associated subunits of lithium 236 and carbon 238. Similarly, the tooling cost 226 of the processor 216 may have associated subunits of labor 240 and machining 242. In various examples, the unit value system 118 may be used as described herein to determine a value driver of the tooling cost 226 (e.g., labor 240 or machining 242) or other subunit.

In some examples, each of the components at BOM level 202 has an associated record at the BOM table 108, where fields of the record indicate the subunits 204 of the component. In another example, each separate component and subunit 204 is indicated by a separate record at the BOM table 108.

The database management system 120 may also maintain a unit value table 111 at the data store 128 that may be used to store unit value data and, in some examples, to determine the value drivers of a unit. For example, the unit value system 118 may receive unit value data from one or more supplier computing devices 110A, 110B, 110N. The unit value data may be received via a user interface page provided by the web application, as described herein. The unit value data received from a particular supplier computing device 110A, 110B, 110N may include a total value for a unit or component provided by the associated supplier as well as values for subunits thereof. Referring back to the example of FIG. 2, suppliers providing unit value data for the processor 216 may provide value data indicating a value of the processor 216, values for the tooling cost 226 and adapters 228, and values for the labor 240 and machining 242.

Unit value data received from a supplier, in some examples, also includes relationship data describing a relationship between subunit values and the value of the overall unit. Examples of relationship data are given herein, for example, by Equations [1] and [2] and it will be appreciated that a variety of different relationships between subunit values and corresponding unit values may be provided by suppliers.

In some examples, each instance of unit value data may be stored as a record at the unit value table 111. For example, a first supplier's unit value data for the processor 216 may be stored at one entry, a second supplier's unit value for the processor 216 may be stored at another entry, and so on.

A unit value analysis, in some examples, can be requested by a user 104 via a user interface 107 provided to a user computing device 106. The user computing device 106 may be or include any suitable computing device including, for example, a desktop computer, a laptop computers, a tablet computer, and the like. The user interface 107, in some examples, is provided via a web application similar to the user interface provided to the supplier computing device 110A, 110B, 110N described herein.

Figure 3:
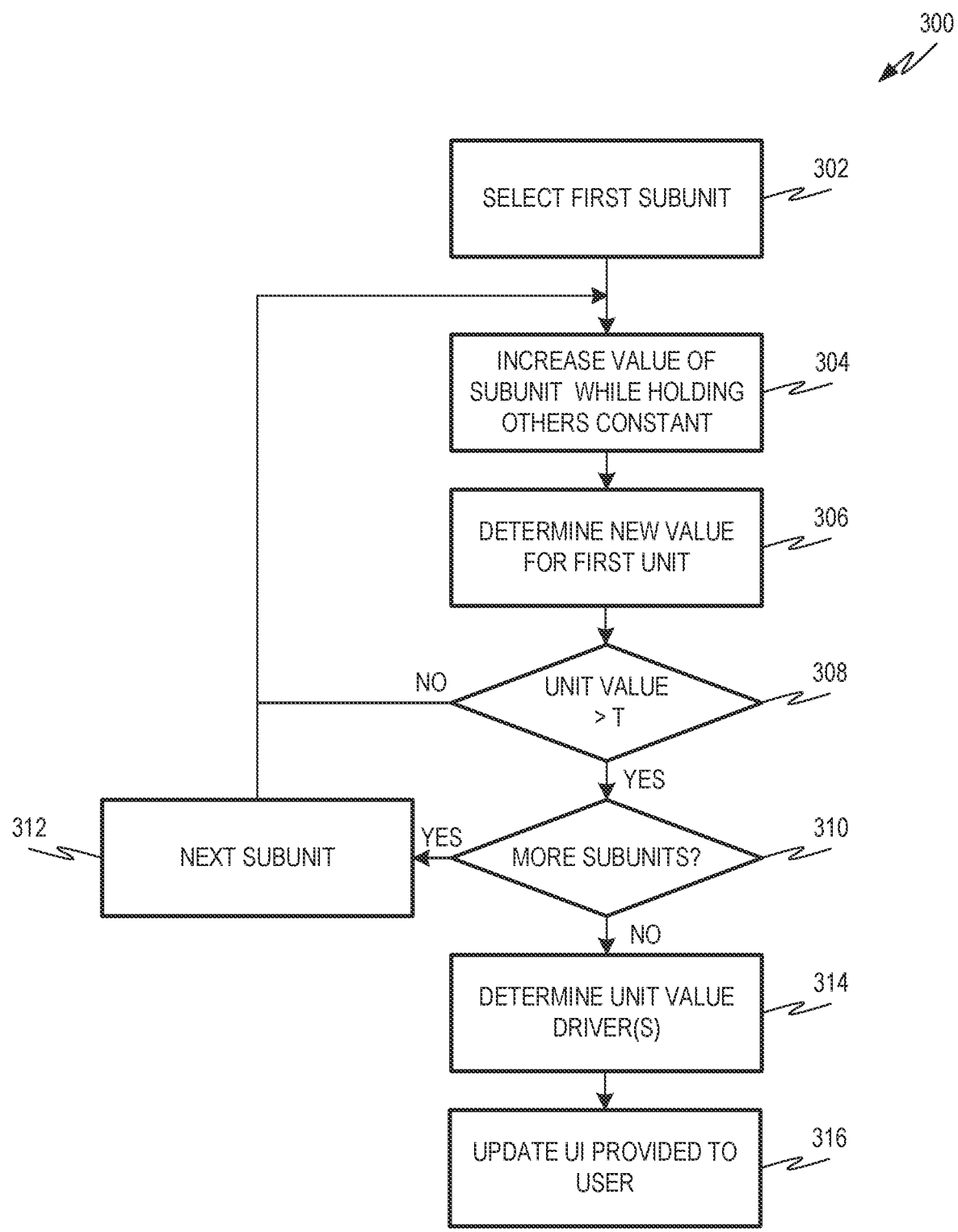
FIG. 3 is a flowchart showing one example of a process flow that can be executed by a web-based analytics system to determine one or more unit value drivers for a unit.

FIG. 3 is a flowchart showing one example of a process flow 300 that can be executed by the web-based analysis system 102 to determine one or more unit value drivers for a unit. The unit, for example, may be a component of a product, such as one of the components 202 shown in the example of FIG. 2. The process flow 300 may be executed, for example, after unit value data has been received from one or more supplier computing devices 110A, 110B, 110N as described herein. In some examples, the process flow 300 is executed separately for separate suppliers. For example, the process flow 300 may be executed to indicate one or more unit value drivers for a unit provided by one supplier and executed again to indicate one or more unit value drivers for the same unit as provided by a second supplier. In some examples, the process flow 300 is initiated by the user 104 via the user interface 107.

At operation 302, the unit value system 118 selects a first subunit of the considered unit. At operation 304, the unit value system 118 increases a value of the considered subunit while holding the values of the other subunits constant. The unit value system 118 may increase the value of the considered subunit by an increment (e.g., a fixed increment, a percentage of the initial value, a percentage of the current value, etc.). At operation 306, the unit value system 118 determines a new value for the first unit considering the increase to the value of the considered subunit. The new value may be determined from the relationship data as described herein.

At operation 308, the unit value system 118 determines if the unit value determined at operation 306 is greater than a unit value threshold. The unit value threshold may be selected in any suitable manner (e.g., a predetermined value added to an initial unit value, a percentage of the initial unit value, etc.). If the unit value is not greater than the unit value threshold, then the unit value system 118 increases the value of the considered subunit again at operation 304 and determines a new value for the unit at operation 306.

If the unit value at operation 308 is greater than the threshold, the unit value system 118 records the total increase to the subunit value (e.g., the number of increments added to the subunit value at operation 304 or the number of times that operation 304 was executed). At operation 310, the unit value system 118 determines if there are any additional subunits remaining for the unit. If there are additional subunits, the unit value system 118 moves to consider the next subunit at operation 312 and, at operation 304, increases the value of the next subunit as described herein.

If all subunits of the unit have been considered at operation 310, the unit value system 118, at operation 314, determines one or more value drivers for the unit. This includes comparing the increases made to the various subunits to drive the total unit value to the unit value threshold. In some examples, selecting the value driver subunit includes finding the subunit that caused the total unit value to exceed the unit value threshold with the smallest increase in the subunit value.

An example of this effect is illustrated by the breakout window 130 shown in FIG. 1. The breakout window 130 shows three plots 132, 134, 136 having a horizontal axis indicating sub-unit value and a vertical axis indicating unit value. The dashed horizontal line in the plots 132, 134, 136 shows an example unit value threshold. The plot 132 describes a first subunit. As shown, a large increase in the sub-unit value is experienced before the unit value rises above the unit value threshold, indicated by the dashed line. The plot 134 describes a second subunit. In the example plot 134, only a small increase in subunit value causes the unit value to exceed the unit value threshold. The plot 136 shows another example where the subunit value increase causing the unit value to exceed the unit value threshold is between that depicted by the example plot 132 and that depicted by the example plot 134. In the example shown by the breakout window 130, the subunit described by plot 134 may be considered a primary value driver for the unit. The subunit described by plot 136 may be determined a less significant driver of unit value than the subunit described by the plot 134 and a more significant driver of unit value than the subunit described by plot 132.

Referring back to operation 314, the unit value system 118 may determine a single unit value driver that is the subunit requiring the smallest value increase to drive the unit value to the unit value threshold. In some examples, the unit returned by value system 118 indicates the value increase associated with all of the subunits (e.g., the value increase for the respective subunits that drove the unit value above the unit value threshold). At operation 316, the unit value system 118 may update the user interface 107 provided to the user 104 to indicate some or all of the results determined at operation 314.

Figure 4:
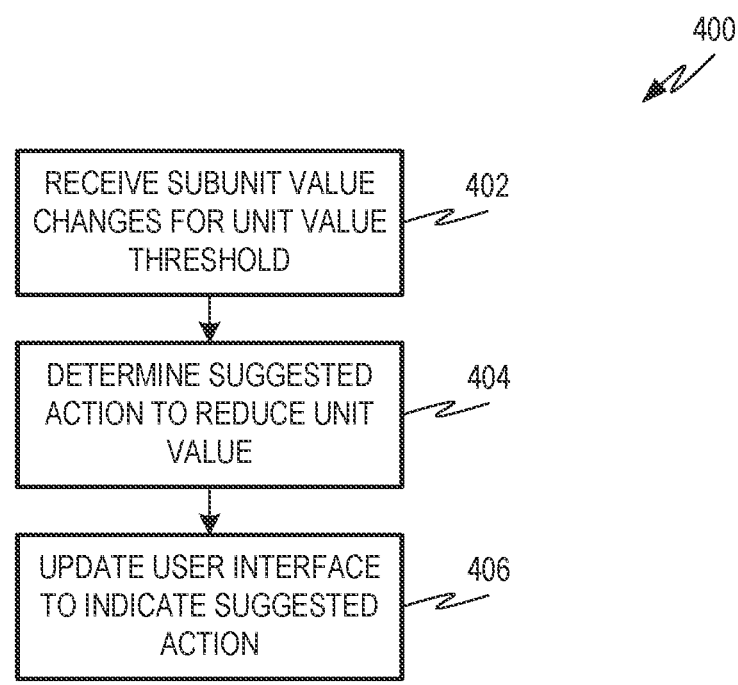
FIG. 4 is a flowchart showing one example of a process flow that may be executed to utilize results of the process flow of FIG. 3.

FIG. 4 is a flowchart showing one example of a process flow 400 that may be executed by the unit value system 118 to utilize results of the process flow 300. At operation 402, the unit value system 118 receives subunit value changes for a considered unit, for example, as determined using the process flow chart. For example, the subunit value changes may be the subunit value changes that drove the value of the unit to the unit value threshold.

At operation 404, the unit value system 118 determines a suggested action to reduce the value of the unit. It may be desirable to reduce the value of a unit, for example, to reduce the total cost to produce a product including the unit. In some examples, the action determined at operation 404 includes substituting one type of unit or subunit for another. Referring to the example of FIG. 2, for example, if lithium 236 is a value driver for the raw material cost 224 and/or the battery 212, the suggested action may include utilizing a nickel cadmium battery 212 instead of a lithium ion battery 212. Also, in some examples, the suggested action may include negotiating a lower price for a unit and/or selecting a different supplier. For example, if the tooling cost 226 is a significant value driver of the processor 216, the suggested action may include suggesting that the supplier reduce the tooling cost 226 and/or selecting a different supplier with a lower tooling cost 226. At operation 406, the unit value system 118 updates the user interface 107 provided to the user 104 to indicate the suggested action determined at operation 404.

Figure 5:
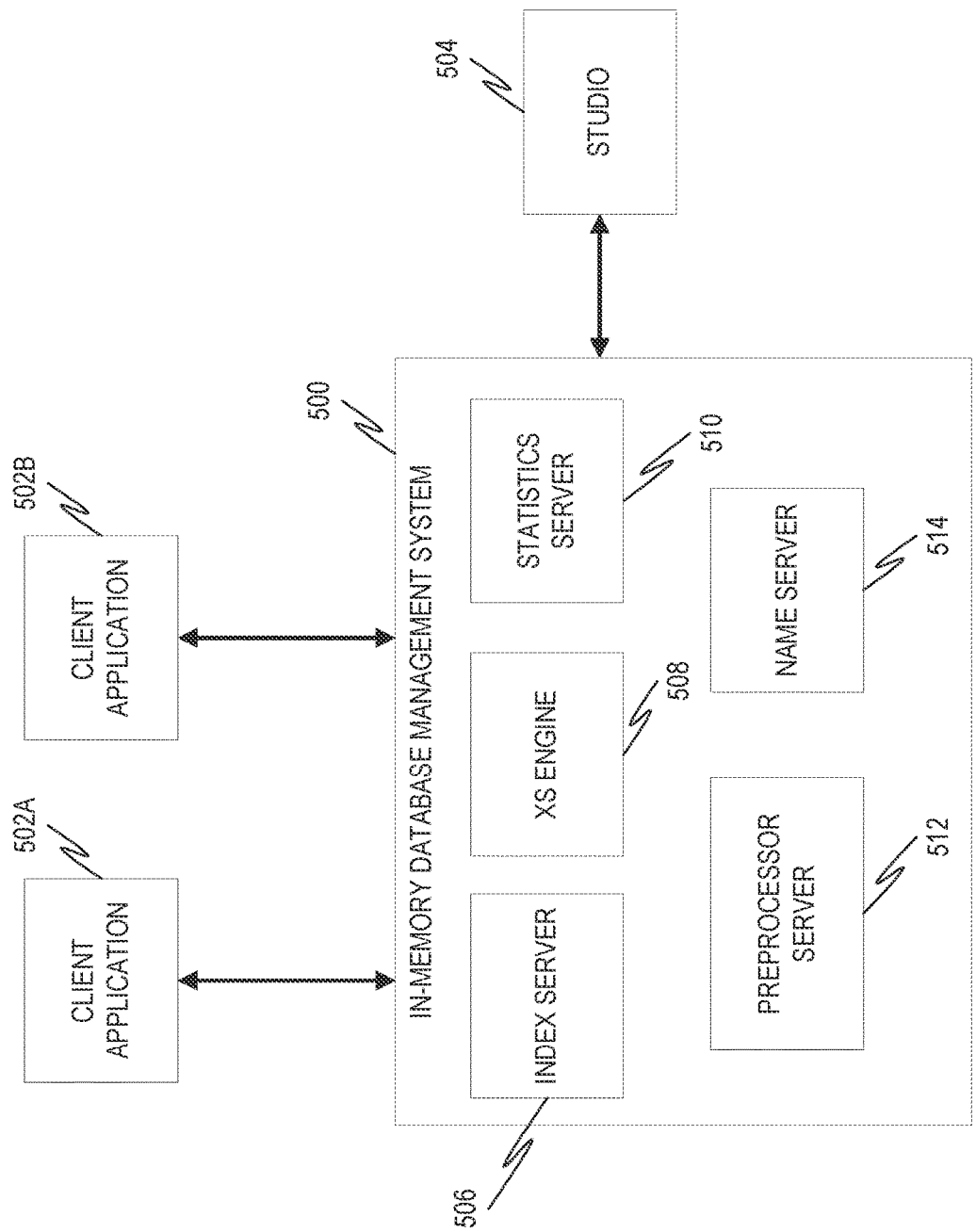
FIG. 5 is a diagram illustrating an example of an in-memory database management system that may be used to implement table privilege management, for example, as described herein.

FIG. 5 is a diagram illustrating an example of an in-memory database management system 500. The in-memory database management system 500 shows one example arrangement that may be used to implement the database management system 120 and data store 128 of FIG. 1. An in-memory database stores data primarily at main memory, such as a random access memory. This is different than databases that primarily employ a disk storage mechanism. In some examples, the database management system 500 may be or include an example of the HANA system from SAP SE of Walldorf, Germany. Although various features of carbon footprint optimization are described herein in the context of an in-memory database, carbon footprint optimization may be generally performed at any suitable database management system.

The in-memory database management system 500 may be coupled to one or more client applications 502A, 502B. Client applications 502A, 502B may be web applications configured to perform operations similar to those of the web applications described by FIG. 1, including the web applications implemented by web application code 114A, 114B, 114N and one or more web applications executed by the user computing device 106 to serve the user interface 107. The client applications 502A, 502B may communicate with the in-memory database management system 500 through a number of different protocols, including Structured Query Language (SQL), Multidimensional Expressions (MDX), Hypertext Transfer Protocol (HTTP). Representational State Transfer (REST), and Hypertext Markup Language (HTML).

FIG. 5 also shows a studio 504 that may be used to perform modeling by accessing the in-memory database management system 500. In some examples, the studio 504 may allow complex analysis to be performed on data drawn not only from real time event data and windows, but also from stored database information. In some examples, carbon footprint data may be generated by the studio as described herein. The studio 504, in some examples, is configured to implement the unit value system 118 and/or the supplier sourcing system 116 described herein.

The in-memory database management system 500 may comprise a number of different components, including an index server 506, an XS engine 508, a statistics server 510, a preprocessor server 512, and a name server 514. These components may operate on a single computing device or may be spread among multiple computing devices (e.g., separate servers). The index server 506 contains the actual data and the engines for processing the data. It may also coordinate and uses the other servers.

The XS engine 508 allows clients to connect to the in-memory database management system 500 using web protocols, such as HTTP. Although the XS engine 508 is illustrated as a component of the in-memory database management system 500, in some examples, the XS engine may be implemented as one or more Application Program Interfaces (APIs) and/or services positioned between the client applications 502A, 502B and the in-memory database management system 500. In some examples, the XS engine 508 may handle client requests received in languages other than SQL such as, for example, MDX, HTTP, REST, HTML, and so forth.

The statistics server 510 collects information about status, performance, and resource consumption from all the other server components. The statistics server 510 can be accessed from the studio 504 to obtain the status of various alert monitors.

The preprocessor server 512 is used for analyzing text data and extracting the information on which the text search capabilities are based.

The name server 514 holds information about the database topology. This is used in a distributed system with instances of the database on different hosts. The name server 514 knows where the components are running and which data is located on which server. In an example embodiment, a separate enqueue server may operate in the manner described above with respect to enqueue servers, specifically with regard to creating and managing lightweight enqueue sessions.

Figure 6:
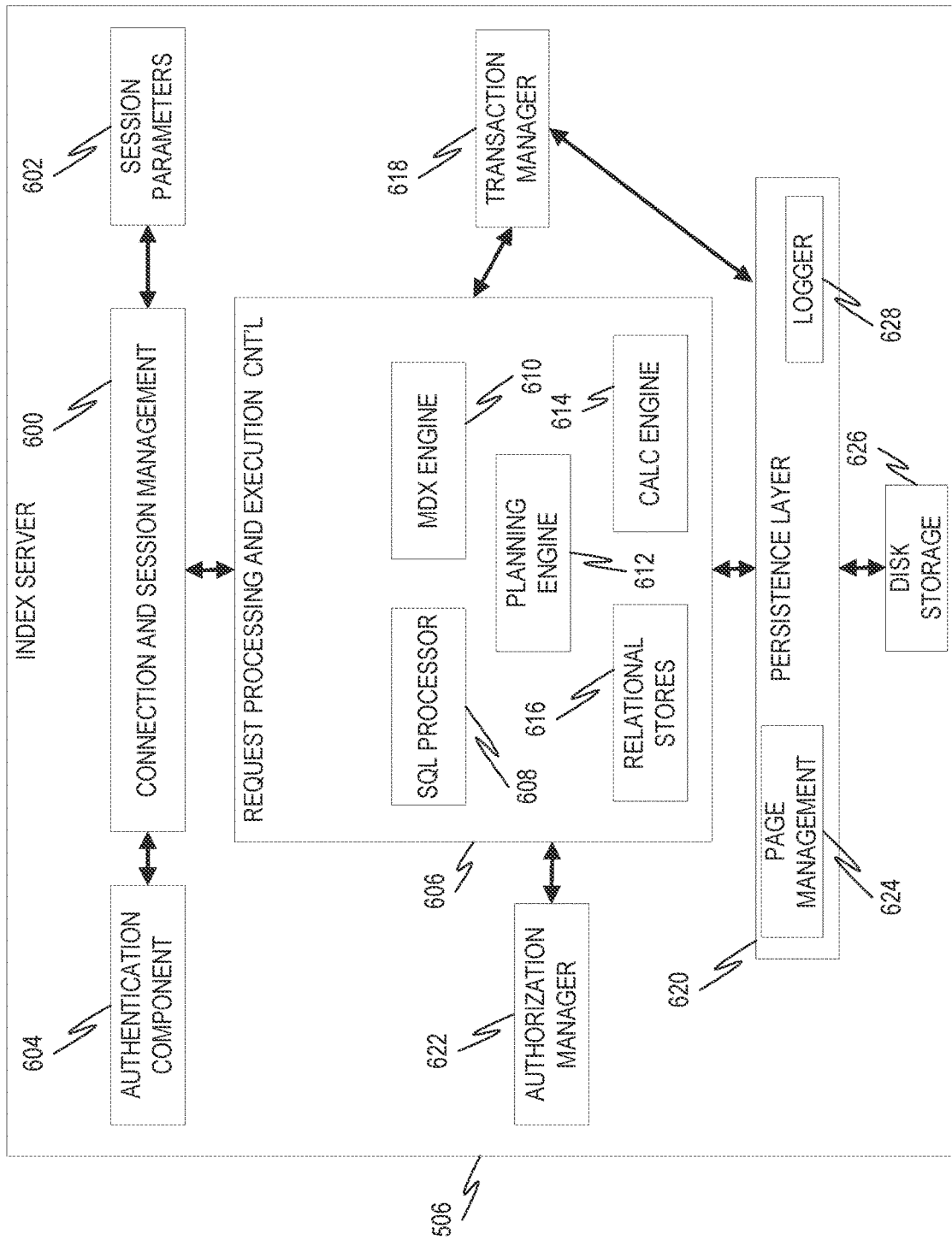
FIG. 6 is a diagram illustrating an example of an index server of the in-memory database management system of FIG. 5.

FIG. 6 is a diagram illustrating an example of the index server 506. Specifically, the index server 506 of FIG. 5 is depicted in more detail. The index server 506 includes a connection and session management component 600, which is responsible for creating and managing sessions and connections for the database clients (e.g. client applications 502A, 502B). Once a session is established, clients can communicate with the database system using SQL statements. For each session, a set of session parameters 602 may be maintained, such as auto-commit, current transaction isolation level, and so forth. Users (e.g., system administrators, developers) may be authenticated by the database system itself (e.g., by logging in with log-in information such as a username and password, using an authentication component 604) or authentication can be delegated to an external authentication provider such as a Lightweight Directory Access Protocol (LDAP) directory.

Client requests, such as contract form requests, can be analyzed and executed by a set of components summarized as request processing and execution control 606. An SQL processor 608 checks the syntax and semantics of the client SQL statements and generates a logical execution plan. MDX is a language for querying and manipulating multi-dimensional data stored in Online Analytical Processing (OLAP) cubes. As such, an MDX engine 610 may be provided to allow for the parsing and executing of MDX commands. A planning engine 612 allows applications to execute basic planning operations in the database layer. One such operation is to create a new version of a dataset as a copy of an existing dataset, while applying filters and transformations.

A calculation engine 614 implements the various SQL script and planning operations. The calculation engine 614 creates a logical execution plan for calculation models derived from SQL script, MDX, planning, and domain-specific models. This logical execution plan may include, for example, breaking up a model into operations that can be processed in parallel. The data is stored in relational stores 616, which implement a relational database in main memory. Each SQL statement may be processed in the context of a transaction. New sessions are implicitly assigned to a new transaction. A transaction manager 618 coordinates database transactions, controls transactional isolation, and keeps track of running and closed transactions. When a transaction is committed or rolled back, the transaction manager 618 informs the involved engines about this event so they can execute needed actions. The transaction manager 618 also cooperates with a persistence layer 620 to achieve atomic and durable transactions.

An authorization manager 622 is invoked by other database system components to check whether the user has the specified privileges to execute the requested operations. The database system allows for the granting of privileges to users or roles. A privilege grants the right to perform a specified operation on a specified object.

The persistence layer 620 ensures that the database is restored to the most recent committed state after a restart and that transactions are either completely executed or completely undone. To achieve this goal in an efficient way, the persistence layer 620 uses a combination of write-ahead logs, shadow paging, and save points. The persistence layer 620 also offers a page management interface 624 for writing and reading data to a separate disk storage 626, and also contains a logger 628 that manages the transaction log. Log entries can be written implicitly by the persistence layer 620 when data is written via the persistence interface or explicitly by using a log interface.

Figure 7:
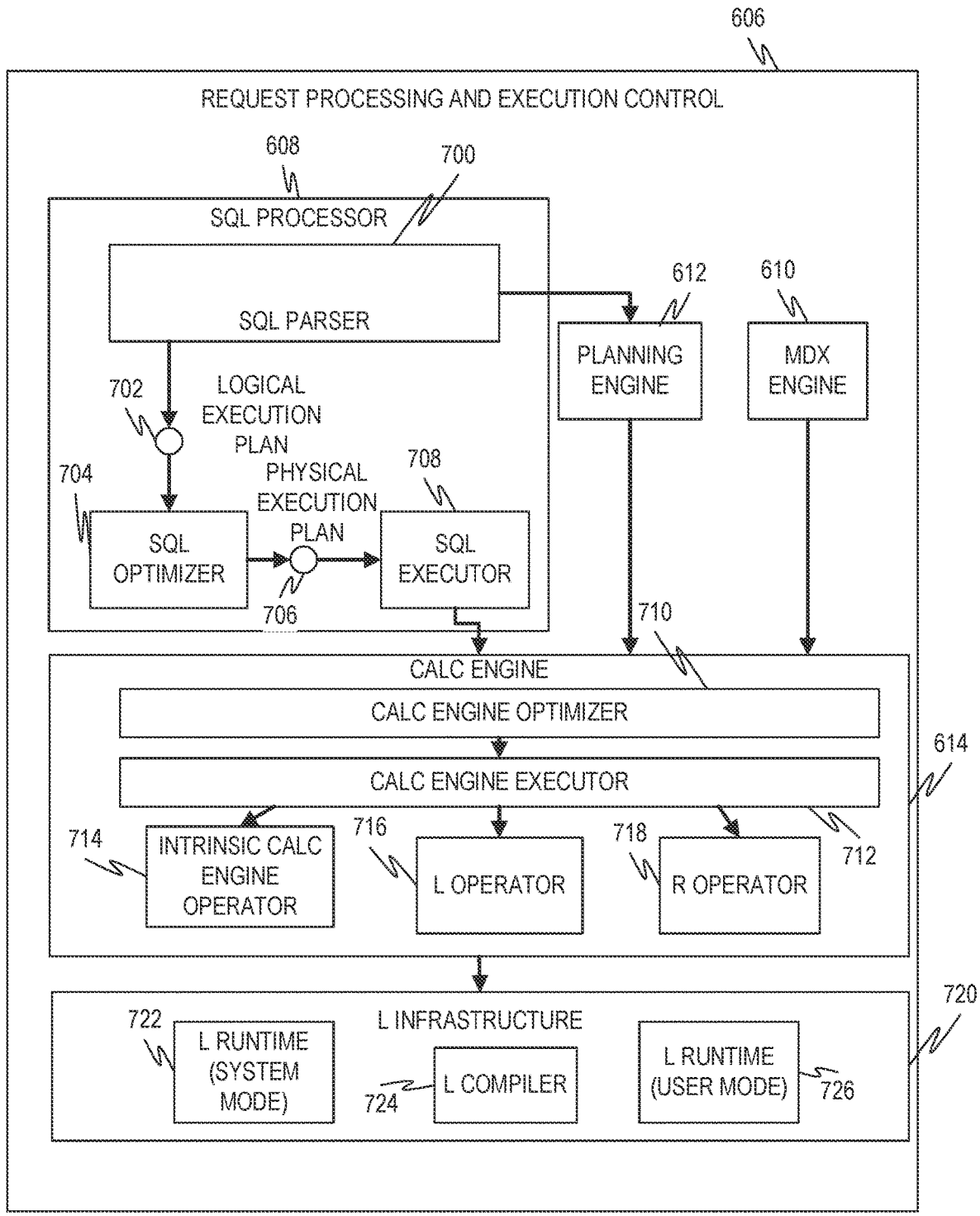
FIG. 7 is a diagram illustrating one example of the request processing and execution control of the database management system of FIG. 7.

FIG. 7 is a diagram illustrating one example of the request processing and execution control 606. This diagram depicts the request processing and execution control 606 of FIG. 6 in more detail. The SQL processor 608 contains an SQL parser 700, which parses the SQL statement and generates a logical execution plan 702, which it passes to an SQL optimizer 704. The SQL optimizer 704 optimizes the logical execution plan 702 and converts it to a physical execution plan 706, which it then passes to a SQL executor 708. The calculation engine 614 implements the various SQL script and planning operations, and includes a calc engine optimizer 710, which optimizes the operations, and a calc engine executor 712, which executes the operations, as well as an intrinsic calc engine operator 714, an L operator 716, and an R operator 718.

An L infrastructure 720 includes a number of components to aid in the running of L procedures, including an L-runtime (system mode) 722, an L compiler 724, and an L-runtime (User mode) 726.

In view of the disclosure above, various examples are set forth below. It should be noted that one or more features of an example, taken in isolation or combination, should be considered within the disclosure of this application.

Examples

Example 1 is a computer-implemented system for determining an impact of a subunit on the value of a unit, the system comprising: a web-based analytics system comprising at least one processor and an associated memory, the web-based analytics system programmed to perform operations comprising: providing web application code to a first supplier computing system, the web application code to be executed at a browser of the first supplier computing system to provide a first user interface page to the first supplier computing system; receiving, at least in part via the first user interface page, first unit value data describing a first unit, the unit value data describing a plurality of sub-units of the unit and relationship data describing a relationship between a plurality of subunit values described by the unit value data; based on the relationship data, determining a first value of the unit using a set of values for the plurality of subunits; based on the relationship data, increasing a value for a first subunit while holding values for the other subunits constant until the value of the unit increases to a unit value threshold; based on the relationship data, increasing a value for a second subunit while holding values for the other subunits constant until the value of the unit increases to a unit value threshold; comparing an increase in the value of the first subunit to increase the value of the unit to the unit value threshold with an increase in the value of the second subunit to increase the value of the unit to the unit value threshold; based on the comparing, determining that the first subunit is a more significant driver of the value of the unit than the second subunit; and serving a user interface to a user computing device, the user interface indicating that the first subunit is a more significant driver of the value of the unit than the second subunit.

In Example 2, the subject matter of Example 1 optionally includes the operations further comprising: based on the comparing, determining a suggested action for reducing a value of the unit; and serving the suggested action to the user computing device via the user interface.

In Example 3, the subject matter of Example 2 optionally includes wherein the suggested action comprises substituting the first subunit for an alternative first subunit.

In Example 4, the subject matter of any one or more of Examples 1-3 optionally include wherein the comparing comprises determining that the increase in the value of the first subunit to increase the value of the unit to the unit value threshold is less than the increase in the value of the second subunit to increase the value of the unit to the unit value threshold.

In Example 5, the subject matter of any one or more of Examples 1-4 optionally include the operations further comprising: based on the relationship data, increasing a value for a third subunit while holding values for the other subunits constant to determine a second value of the unit; and determining that the second value of the unit is equivalent to the first value of the unit, wherein the user interface indicates that the third subunit is not a significant driver of the value of the unit.

In Example 6, the subject matter of any one or more of Examples 1-5 optionally include wherein the increasing of the value for the first subunit while holding values for the other subunits constant until the value of the unit increases to a unit value threshold comprises: increasing the value for the first subunit by a first increment to generate a first incremented value for the subunit; determining a second value of the unit using the first incremented value for the subunit with values for a remainder of the subunits from the set of values for the plurality of subunits; determining that the second value of the unit is less than the unit value threshold; and increasing the first incremented value for the subunit by the first increment to generate a second incremented value for the subunit.

In Example 7, the subject matter of any one or more of Examples 1-6 optionally include the operations further comprising: determining a significant driver of the value of the first subunit, wherein the user interface also indicates the significant driver of the value of the first subunit.

Example 8 is a method of operating a computing system to determine an impact of a subunit on the value of a unit: providing, by the computing system, web application code to a first supplier computing system, the web application code to be executed at a browser of the first supplier computing system to provide a first user interface page to the first supplier computing system; receiving, by the computing system at least in part via the first user interface page, first unit value data describing a first unit, the unit value data describing a plurality of sub-units of the unit and relationship data describing a relationship between a plurality of subunit values described by the unit value data; based on the relationship data, determining a first value of the unit using a set of values for the plurality of subunits; based on the relationship data, increasing a value for a first subunit while holding values for the other subunits constant until the value of the unit increases to a unit value threshold; based on the relationship data, increasing a value for a second subunit while holding values for the other subunits constant until the value of the unit increases to a unit value threshold; comparing an increase in the value of the first subunit to increase the value of the unit to the unit value threshold with an increase in the value of the second subunit to increase the value of the unit to the unit value threshold; based on the comparing, determining that the first subunit is a more significant driver of the value of the unit than the second subunit; and serving a user interface to a user computing device, the user interface indicating that the first subunit is a more significant driver of the value of the unit than the second subunit.

In Example 9, the subject matter of Example 8 optionally includes based on the comparing, determining a suggested action for reducing a value of the unit; and serving the suggested action to the user computing device via the user interface.

In Example 10, the subject matter of Example 9 optionally includes wherein the suggested action comprises substituting the first subunit for an alternative first subunit.

In Example 11, the subject matter of any one or more of Examples 8-10 optionally include wherein the comparing comprises determining that the increase in the value of the first subunit to increase the value of the unit to the unit value threshold is less than the increase in the value of the second subunit to increase the value of the unit to the unit value threshold.

In Example 12, the subject matter of any one or more of Examples 8-11 optionally include based on the relationship data, increasing a value for a third subunit while holding values for the other subunits constant to determine a second value of the unit; and determining that the second value of the unit is equivalent to the first value of the unit, wherein the user interface indicates that the third subunit is not a significant driver of the value of the unit.

In Example 13, the subject matter of any one or more of Examples 8-12 optionally include wherein the increasing of the value for the first subunit while holding values for the other subunits constant until the value of the unit increases to a unit value threshold comprises: increasing the value for the first subunit by a first increment to generate a first incremented value for the subunit; determining a second value of the unit using the first incremented value for the subunit with values for a remainder of the subunits from the set of values for the plurality of subunits; determining that the second value of the unit is less than the unit value threshold; and increasing the first incremented value for the subunit by the first increment to generate a second incremented value for the subunit.

In Example 14, the subject matter of any one or more of Examples 8-13 optionally include determining a significant driver of the value of the first subunit, wherein the user interface also indicates the significant driver of the value of the first subunit.

Example 15 is a non-transitory machine-readable medium comprising instructions thereon that, when executed by at least one processor, causes the at least one processor to perform operations comprising: providing web application code to a first supplier computing system, the web application code to be executed at a browser of the first supplier computing system to provide a first user interface page to the first supplier computing system; receiving, at least in part via the first user interface page, first unit value data describing a first unit, the unit value data describing a plurality of sub-units of the unit and relationship data describing a relationship between a plurality of subunit values described by the unit value data; based on the relationship data, determining a first value of the unit using a set of values for the plurality of subunits; based on the relationship data, increasing a value for a first subunit while holding values for the other subunits constant until the value of the unit increases to a unit value threshold; based on the relationship data, increasing a value for a second subunit while holding values for the other subunits constant until the value of the unit increases to a unit value threshold; comparing an increase in the value of the first subunit to increase the value of the unit to the unit value threshold with an increase in the value of the second subunit to increase the value of the unit to the unit value threshold; based on the comparing, determining that the first subunit is a more significant driver of the value of the unit than the second subunit; and serving a user interface to a user computing device, the user interface indicating that the first subunit is a more significant driver of the value of the unit than the second subunit.

In Example 16, the subject matter of Example 15 optionally includes based on the comparing, determining a suggested action for reducing a value of the unit; and serving the suggested action to the user computing device via the user interface.

In Example 17, the subject matter of Example 16 optionally includes wherein the suggested action comprises substituting the first subunit for an alternative first subunit.

In Example 18, the subject matter of any one or more of Examples 15-17 optionally include wherein the comparing comprises determining that the increase in the value of the first subunit to increase the value of the unit to the unit value threshold is less than the increase in the value of the second subunit to increase the value of the unit to the unit value threshold.

In Example 19, the subject matter of any one or more of Examples 15-18 optionally include based on the relationship data, increasing a value for a third subunit while holding values for the other subunits constant to determine a second value of the unit; and determining that the second value of the unit is equivalent to the first value of the unit, wherein the user interface indicates that the third subunit is not a significant driver of the value of the unit.

In Example 20, the subject matter of any one or more of Examples 15-19 optionally include wherein the increasing of the value for the first subunit while holding values for the other subunits constant until the value of the unit increases to a unit value threshold comprises: increasing the value for the first subunit by a first increment to generate a first incremented value for the subunit; determining a second value of the unit using the first incremented value for the subunit with values for a remainder of the subunits from the set of values for the plurality of subunits; determining that the second value of the unit is less than the unit value threshold; and increasing the first incremented value for the subunit by the first increment to generate a second incremented value for the subunit.

Figure 8:
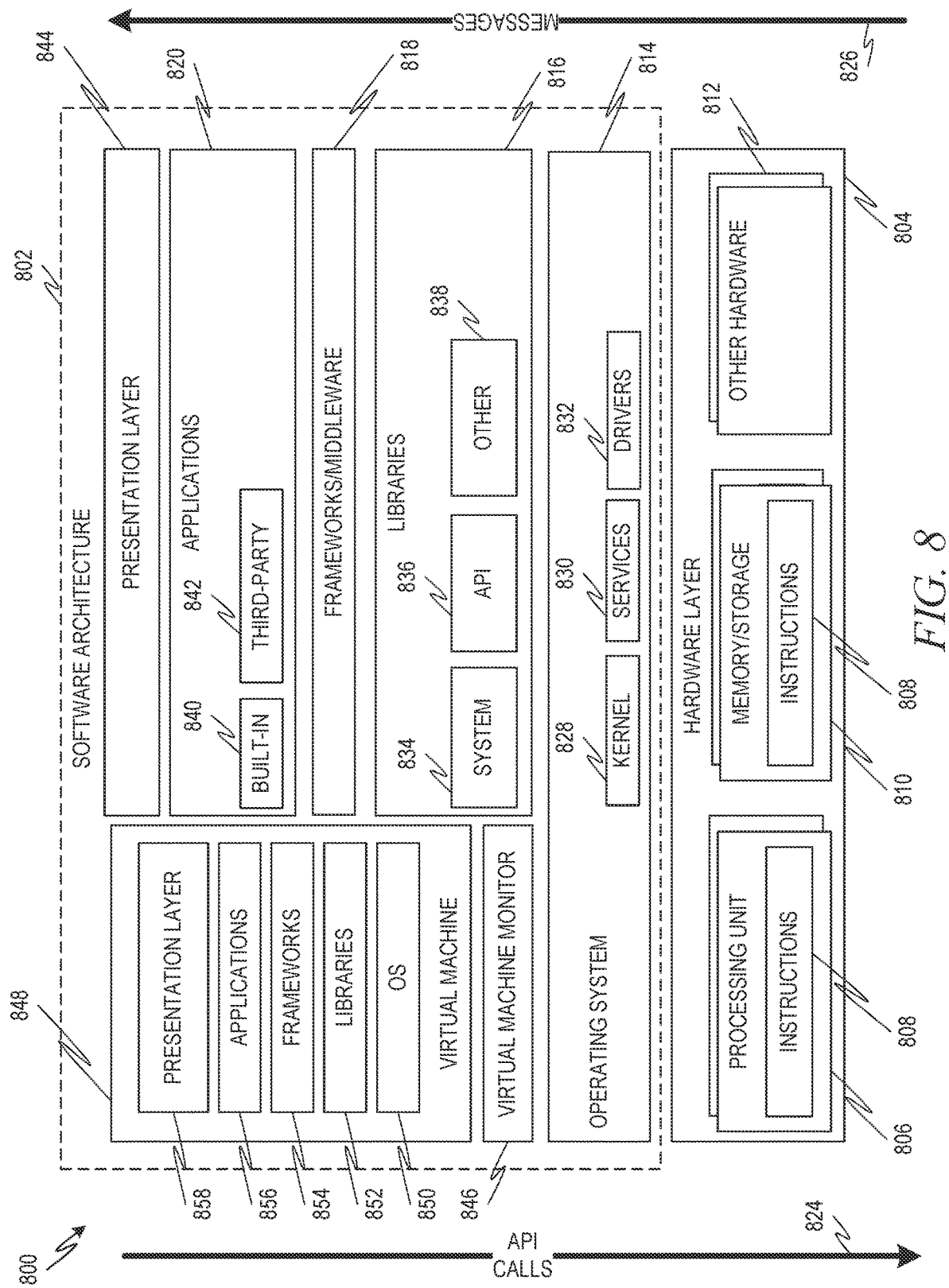
FIG. 8 is a block diagram showing one example of a software architecture for a computing device.

FIG. 8 is a block diagram 800 showing one example of a software architecture 802 for a computing device. The architecture 802 may be used in conjunction with various hardware architectures, for example, as described herein. FIG. 8 is merely a non-limiting example of a software architecture and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system of FIG. 8.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 which represents any other hardware of the hardware layer 804, such as the other hardware illustrated as part of the architecture 802.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and presentation layer 844. Operationally, the applications 820 and/or other components within the layers may invoke API calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system 834 libraries (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 and/or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 includes built-in applications 840 and/or third party applications 842. Examples of representative built-in applications 840 may include, but are not limited to, a contacts application, a browser application, a book reader application, a location application, a media application, a messaging application, and/or a game application. Third party applications 842 may include any of the built in applications as well as a broad assortment of other applications. In a specific example, the third party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 842 may invoke the API calls 824 provided by the mobile operating system such as operating system 814 to facilitate functionality described herein.

The applications 820 may utilize built in operating system functions (e.g., kernel 828, services 830 and/or drivers 832), libraries (e.g., system 834, APIs 836, and other libraries 838), and frameworks/middleware 818 to create user interfaces to interact with users of the system. Alternatively, or additionally, in some systems interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine as well as the interface with the host operating system (i.e., operating system 814). A software architecture executes within the virtual machine such as an operating system 850, libraries 852, frameworks/middleware 854, applications 856 and/or presentation layer 858. These layers of software architecture executing within the virtual machine 848 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 9:
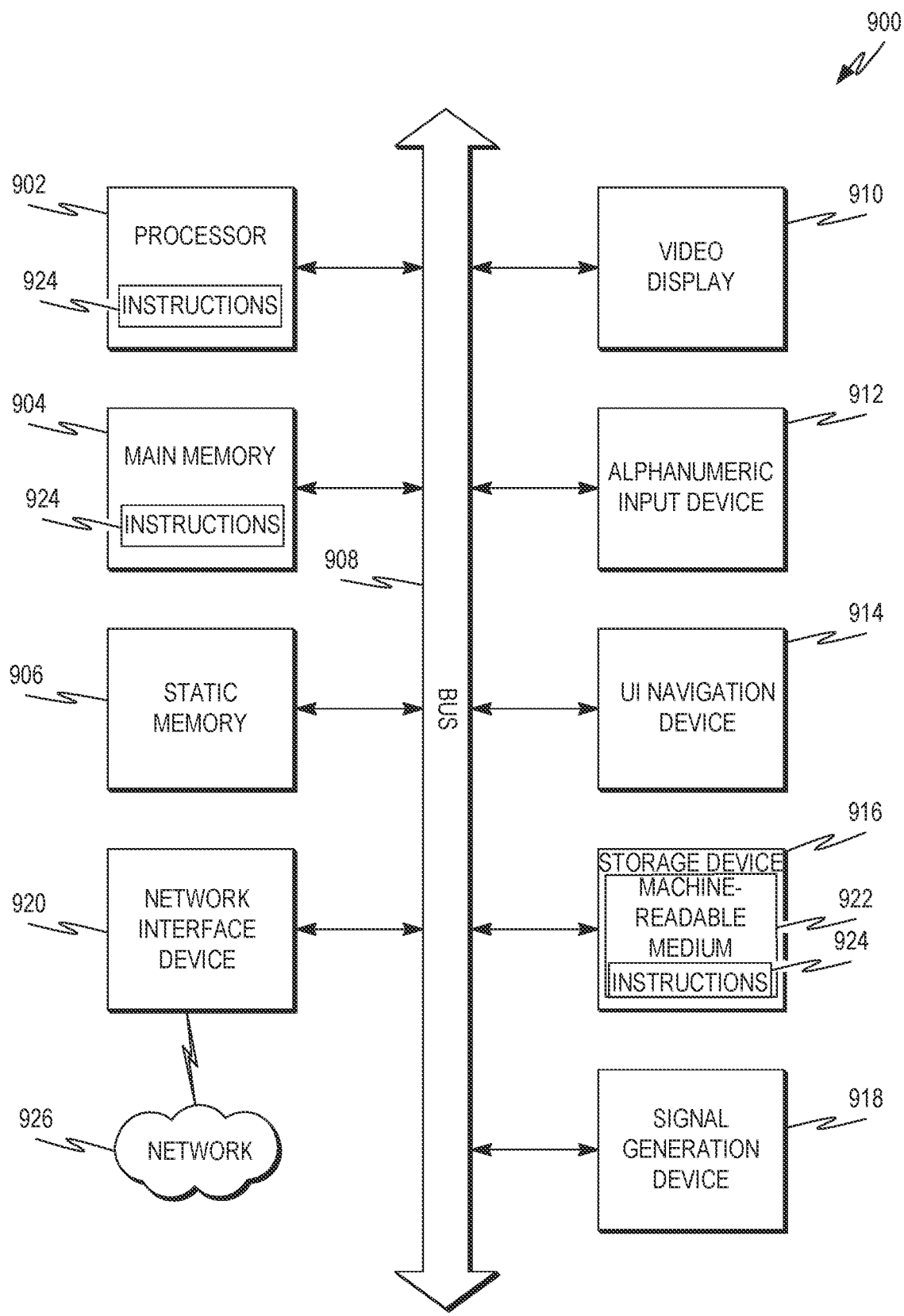
FIG. 9 is a block diagram of a machine in the example form of a computer system within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation (or cursor control) device 914 (e.g., a mouse), a disk drive unit 916, a signal generation device 918 (e.g., a speaker), and a network interface device 920.

Machine-Readable Medium

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media 922.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented system for valuing an article of manufacture comprising a plurality of units, the system comprising:
   a web-based analytics system in communication with a plurality of supplier computing devices, the web-based analytics system comprising at least one processor and an associated memory, the web-based analytics system programmed to perform operations comprising:
      obtaining unit value data describing a plurality of units of the article of manufacture by providing web application code to the plurality of supplier computing devices, the web application code to be executed at least one of the plurality of supplier computing devices to perform operations comprising:
         generating a first user interface page, the first user interface page comprising an input feature that, when selected by a first user, prompts the first user to provide a first supplier link indicating an address of a first supplier accounting database management system associated with a first supplier and a second input feature that, when selected by the first user, prompts the first user to provide a second supplier link indicating an address of a second supplier accounting database management system associated with a second supplier;
         using the first supplier link, querying the first supplier accounting database management system to obtain first unit value data describing a cost of a first unit of the plurality of units, the first unit value data describing a plurality of subunits of the first unit, and first relationship data describing a first relationship between a plurality of subunit values described by the first unit value data;
         using the second supplier link, querying the second supplier accounting database management system to obtain second unit value data describing a cost of a second unit of the plurality of units, the second unit value data describing a plurality of subunits of the second unit, and second relationship data describing a second relationship between a plurality of subunit values described by the second unit value data; and
         sending the first unit value data and the second unit value data to the web-based analytics system;
      accessing cumulative unit value data received from a plurality of accounting database management systems using a plurality of supplier links, the cumulative unit value data comprising the first unit value data obtained using the first supplier link and the second unit value data obtained using the second supplier link;
      iteratively processing unit value data describing the plurality of units, the iterative processing comprising, for the first unit value data describing the cost of the first unit:
         based on the first relationship data, determining a first cost of the first unit using a set of values for the plurality of subunits;

based on the first relationship data, determining an increased cost for a first subunit such that a first new unit cost of the unit meets a unit cost threshold, the first new unit cost being based on the increased cost for the first subunit with costs for a remainder of the plurality of subunits held constant; and based on the first relationship data, determining an increased cost for a second subunit such that a second new unit cost of the first unit meets the unit cost threshold, the second new unit cost being based on the increased cost for the second subunit with costs for a remainder of the plurality of subunits held constant;

comparing the increased cost for the first subunit and the increased cost for the second subunit;

based on the comparing, determining that the first subunit is a more significant driver of the cost of the first unit than the second subunit;

serving a user interface to a user computing device, the user interface indicating that the first subunit is a more significant driver of the cost of the first unit than the second subunit; and a database management system programmed to perform operations comprising writing the cumulative unit value data received from the plurality of accounting database management systems to a unit value table.

2. The system of claim 1, the operations further comprising:
based on the comparing, determining a suggested action for reducing the cost of the first unit; and
serving the suggested action to the user computing device via the user interface.

3. The system of claim 2, wherein the suggested action comprises substituting the first subunit for an alternative first subunit.

4. The system of claim 1, wherein the comparing comprises determining that the increased cost for the first subunit is less than the increased cost for the second subunit.

5. The system of claim 1, the operations further comprising:
based on the first relationship data, determining an increased cost for a third subunit such that a third new unit cost of the first unit meets the unit cost threshold, the third new unit cost being based on the increased cost for the third subunit with costs for a remainder of the plurality of subunits held constant; and
determining that the increased cost for the third subunit is equivalent to the increased cost for the second subunit, wherein the user interface indicates that the third subunit is not a significant driver of the cost of the first unit.

6. The system of claim 1, wherein the determining the increased cost for the first subunit comprises:
generating a first incremented cost for the first subunit, the first incremented cost for the first subunit being greater than a cost for the first subunit by a first increment;
determining a second cost of the first unit using the first incremented cost for the first subunit with costs for a remainder of the plurality of subunits;
determining that the second cost of the first unit is less than the unit cost threshold; and
generating a second incremented cost for the first subunit, the second incremented cost for the first subunit being greater than the first incremented cost for the first subunit by the first increment.

7. The system of claim 1, the operations further comprising:

determining a significant driver of the cost of the first subunit, wherein the user interface also indicates the significant driver of the cost of the first subunit.

8. A method of operating at least one computing system to value an article of manufacture comprising a plurality of units, the method comprising:
providing, by a web-based analytics computing system, web application code to a plurality of supplier computing system;
executing the web application code, by a first supplier computing system of the plurality of supplier computing systems, the executing of the web application code causing the first supplier computing system to perform operations comprising:
generating a first user interface page, the first user interface page comprising an input feature that, when selected by a first user, prompts the first user to provide a first supplier link indicating an address of a first supplier accounting database management system associated with a first supplier and a second input feature that, when selected by the first user, prompts the first user to provide a second supplier link indicating an address of a second supplier accounting database management system associated with a second supplier;
using the first supplier link, query the first supplier accounting database management system to obtain first unit value data describing a cost of a first unit of the plurality of units, the first unit value data describing a plurality of subunits of the first unit, and first relationship data describing a relationship between a plurality of subunit costs described by the first unit value data;
using the second supplier link, querying the second supplier accounting database management system to obtain second unit value data describing a cost of a second unit of the plurality of units, the second unit value data describing a plurality of subunits of the second unit, and second relationship data describing a second relationship between a plurality of subunit values described by the second unit value data; and
sending the first unit value data and the second unit value data to the web-based analytics computing system;
accessing, by the web-based analytics computing system, cumulative unit value data received from a plurality of accounting database management systems using a plurality of supplier links, the cumulative unit value data comprising the first unit value data obtained using the first supplier link and the second unit value data obtained using the second supplier link;
writing, by a database management system, the cumulative unit value data received from the plurality of accounting database management systems to a unit value table;
iteratively processing unit value data describing the plurality of units, by the web-based analytics computing system, the iterative processing comprising, for the first unit value data describing the cost of the first unit:
based on the first relationship data, determining a first cost of the first unit using a set of values for the plurality of subunits;
based on the first relationship data, determining an increased cost for a first subunit such that a first new unit cost of the first unit meets a unit cost threshold, the first new unit cost being based on the increased cost for the first subunit with costs for a remainder of the plurality of subunits held constant; and based on the first relationship data, determining an increased cost for a second subunit such that a second new unit cost of the first unit meets the unit cost threshold, the second new unit cost being based on the increased cost for the second subunit with costs for a remainder of the plurality of subunits held constant;

comparing by the web-based analytics computing system, the increased cost for the first subunit and the increased cost for the second subunit;

based on the comparing, determining by the web-based analytics computing system, that the first subunit is a more significant driver of the cost of the first unit than the second subunit; and serving by the web-based analytics computing system, a user interface to a user computing device, the user interface indicating that the first subunit is a more significant driver of the cost of the first unit than the second subunit.

9. The method of claim 8, further comprising:
based on the comparing, determining a suggested action for reducing the cost of the first unit; and
serving the suggested action to the user computing device via the user interface.

10. The method of claim 9, wherein the suggested action comprises substituting the first subunit for an alternative first subunit.

11. The method of claim 8, wherein the comparing comprises determining that the increased cost for the first subunit is less than the increased cost for the second subunit.

12. The method of claim 8, further comprising:
based on the relationship data, determining an increased cost for a third subunit such that a third new unit cost of the first unit meets the unit cost threshold the third new unit cost being based on the increased cost for the third subunit with costs for a remainder of the plurality of subunits held constant; and
determining that the increased cost for the third subunit is equivalent to the increased cost for the second subunit, wherein the user interface indicates that the third subunit is not a significant driver of the cost of the first unit.

13. The method of claim 8, wherein the determining the increased cost for the first subunit comprises:
generating a first incremented cost for the first subunit, the first incremented cost for the first subunit being greater than a cost for the first subunit by a first increment;
determining a second cost of the first unit using the first incremented cost for the first subunit with costs for a remainder of the plurality of subunits;
determining that the second cost of the first unit is less than the unit cost threshold; and
generating a second incremented cost for the first subunit, the second incremented cost for the first subunit being greater than the first incremented cost for the first subunit by the first increment.

14. The method of claim 8, further comprising:
determining a significant driver of the cost of the first subunit, wherein the user interface also indicates the significant driver of the cost of the first subunit.

15. A non-transitory machine-readable medium comprising instructions thereon that, when executed by at least one processor, causes the at least one processor to perform operations comprising:
providing, by a web-based analytics computing system, web application code to a plurality of supplier computing systems;
executing the web application code, by a first supplier computing system of the plurality of supplier computing systems, the executing of the web application code causing the first supplier computing system to perform operations comprising:
generating a first user interface page, the first user interface page comprising an input feature that, when selected by a first user, prompts the first user to provide a first supplier link indicating an address of a first supplier accounting database management system associated with a first supplier and a second input feature that, when selected by the first user, prompts the first user to provide a second supplier link indicating an address of a second supplier accounting database management system associated with a second supplier;
using the first supplier link, query the first supplier accounting database management system to obtain first unit value data describing a cost of a first unit of a plurality of units, the first unit value data describing a plurality of subunits of the first unit, and first relationship data describing a relationship between a plurality of subunit costs described by the first unit value data;
using the second supplier link, querying the second supplier accounting database management system to obtain second unit value data describing a cost of a second unit of the plurality of units, the second unit value data describing a plurality of subunits of the second unit, and second relationship data describing a second relationship between a plurality of subunit values described by the second unit value data; and
sending the first unit value data and the second unit value data to the web-based analytics computing system;
accessing, by the web-based analytics computing system, cumulative unit value data received from a plurality of accounting database management systems using a plurality of supplier links, the cumulative unit value data comprising the first unit value data obtained using the first supplier link and the second unit value data obtained using the second supplier link;
writing, by a database management system, the cumulative unit value data received from the plurality of accounting database management systems to a unit value table;
iteratively processing unit value data describing the plurality of units, by the web-based analytics computing system, the iterative processing comprising, for the first unit value data describing the cost of the first unit:
based on the first relationship data, determining a first cost of the first unit using a set of values for the plurality of subunits;
based on the first relationship data, determining an increased cost for a first subunit such that a first new unit cost of the first unit meets a unit cost threshold, the first new unit cost being based on the increased cost for the first subunit with costs for a remainder of the plurality of subunits held constant; and
based on the first relationship data, determining an increased cost for a second subunit such that a second new unit cost of the first unit meets the unit cost threshold, the second new unit cost being based on the increased cost for the second subunit with costs for a remainder of the plurality of subunits held constant;
comparing by the web-based analytics computing system, the increased cost for the first subunit and the increased cost for the second subunit;

based on the comparing, determining by the web-based analytics computing system, that the first subunit is a more significant driver of the cost of the first unit than the second subunit; and serving by the web-based analytics computing system, a user interface to a user computing device, the user interface indicating that the first subunit is a more significant driver of the cost of the first unit than the second subunit.

16. The medium of claim 15, further comprising:
based on the comparing, determining a suggested action for reducing the cost of the first unit; and
serving the suggested action to the user computing device via the user interface.

17. The medium of claim 16, wherein the suggested action comprises substituting the first subunit for an alternative first subunit.

18. The medium of claim 15, wherein the comparing comprises determining that the increased cost for the first subunit is less than the increased cost for the second subunit.

19. The medium of claim 15, further comprising:
based on the first relationship data, determining an increased cost for a third subunit such that a third new unit cost of the first unit meets the unit cost threshold the third new unit cost being based on the increased cost for the third subunit with costs for a remainder of the plurality of subunits held constant; and determining that the increased cost for the third subunit is equivalent to the increased cost for the second subunit, wherein the user interface indicates that the third subunit is not a significant driver of the cost of the first unit.

20. The medium of claim 15, wherein the determining the increased cost for the first subunit comprises:
generating a first incremented cost for the first subunit, the first incremented cost for the first subunit being greater than a cost for the first subunit by a first increment;
determining a second cost of the first unit using the first incremented cost for the first subunit with costs for a remainder of the plurality of subunits;
determining that the second cost of the first unit is less than the unit cost threshold; and
generating a second incremented cost for the first subunit, the second incremented cost for the first subunit being greater than the first incremented cost for the first subunit by the first increment.

* * * * *